(12) United States Patent
Backman

(10) Patent No.: US 10,188,040 B2
(45) Date of Patent: Jan. 29, 2019

(54) HAY RAKE WHEEL ANTI-CLOGGING SYSTEM

(71) Applicant: Randy Backman, Peever, SD (US)

(72) Inventor: Randy Backman, Peever, SD (US)

(*) Notice: Subject to any disclaimer, the term of this patent is extended or adjusted under 35 U.S.C. 154(b) by 0 days.

(21) Appl. No.: 15/608,572

(22) Filed: May 30, 2017

(65) Prior Publication Data

US 2018/0343803 A1    Dec. 6, 2018

(51) Int. Cl.
  *A01D 80/02*  (2006.01)
  *A01D 78/14*  (2006.01)

(52) U.S. Cl.
  CPC .......... *A01D 78/146* (2013.01); *A01D 80/02* (2013.01)

(58) Field of Classification Search
  CPC ............... A01D 78/146; A01D 80/02
  USPC .......................................................... 56/374
  See application file for complete search history.

(56) References Cited

U.S. PATENT DOCUMENTS

| | | | |
|---|---|---|---|
| 597,170 A | 1/1898 | Ostrander | |
| 774,706 A | 11/1904 | Smith | |
| 1,812,035 A * | 6/1931 | Carlson | A01D 76/006 56/391 |
| 1,835,273 A | 12/1931 | Byson | |
| 2,926,481 A * | 3/1960 | Van Der Lely | A01D 78/148 56/377 |
| 2,952,111 A * | 9/1960 | Orebaugh | A01D 76/006 56/15.1 |
| 3,715,876 A * | 2/1973 | McCord | A01D 46/28 56/330 |
| 3,832,838 A * | 9/1974 | Hale | A01D 78/125 56/370 |
| 4,048,793 A | 9/1977 | van der Lely et al. | |
| 4,345,422 A * | 8/1982 | Amstutz | A01D 78/125 56/367 |
| 4,418,521 A * | 12/1983 | Orlando | A01D 46/28 56/330 |
| 5,291,726 A * | 3/1994 | Nairn | A01D 46/28 56/330 |
| 6,151,877 A * | 11/2000 | Rowse | A01D 78/14 56/372 |
| 6,543,212 B2 | 4/2003 | Tonutti | |
| 6,840,027 B2 | 1/2005 | Donselaar | |
| 7,303,025 B2 * | 12/2007 | Mayer | A01G 20/30 172/123 |

FOREIGN PATENT DOCUMENTS

| | | |
|---|---|---|
| EP | 0903067 A3 | 3/1999 |
| GB | 1429537 | 3/1976 |

\* cited by examiner

*Primary Examiner* — Thomas B Will
*Assistant Examiner* — Mai T Nguyen

(57) ABSTRACT

A hay rake wheel anti-clogging system for preventing clogging of the tines of a hay rake wheel during use includes a hay rake wheel coupled to a vehicle. The hay rake wheel has a plurality of tines extending from a hub. The tines are rotated for raking. A mount is coupled to the vehicle proximate to the hay rake wheel. An elongated rod is coupled to and extends from the mount adjacent to the hay rake wheel such that the rod contacts the tines as the tines are urged towards the rod by movement of the vehicle in a manner rotating the hay rake wheel.

12 Claims, 6 Drawing Sheets

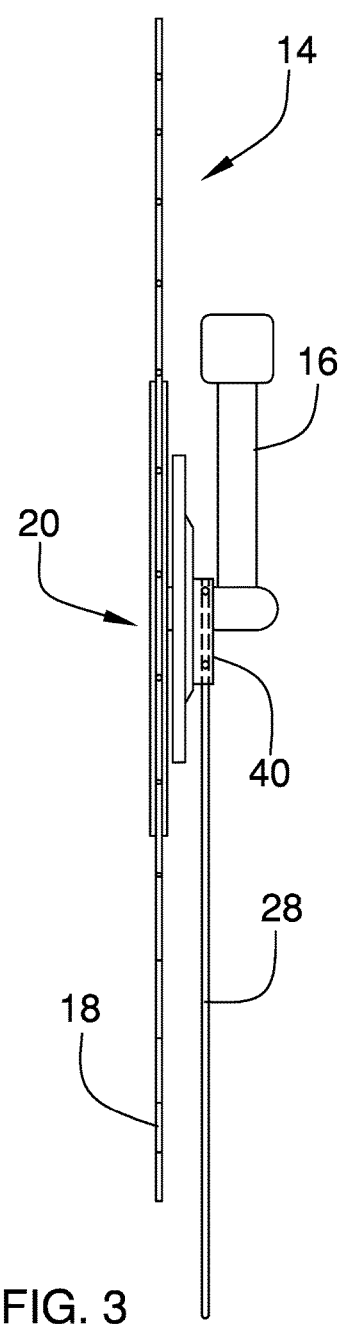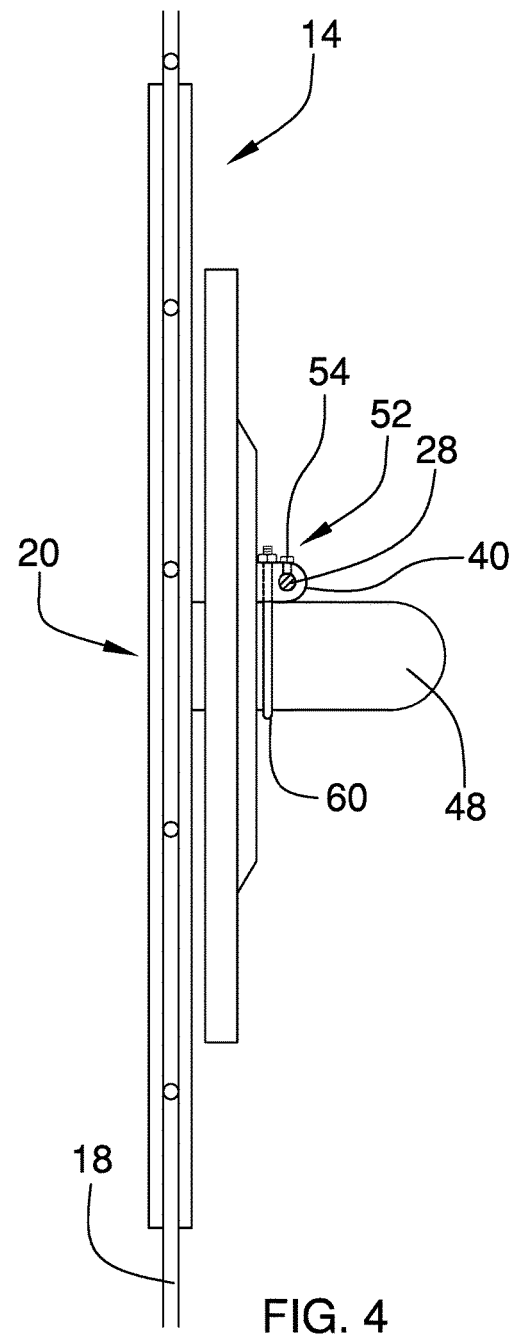

HAY RAKE WHEEL ANTI-CLOGGING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to hay rake wheel devices and more particularly pertains to a new hay rake wheel device for preventing clogging of the tines of a hay rake wheel during use.

BRIEF SUMMARY OF THE INVENTION

An embodiment of the disclosure meets the needs presented above by generally comprising a hay rake wheel coupled to a vehicle. The hay rake wheel has a plurality of tines extending from a hub. The tines are rotated for raking. A mount is coupled to the vehicle proximate to the hay rake wheel. An elongated rod is coupled to and extends from the mount adjacent to the hay rake wheel such that the rod contacts the tines as the tines are urged towards the rod by movement of the vehicle in a manner rotating the hay rake wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a cross-sectional view of an embodiment of the disclosure taken along line 4-4 of FIG. 2.

DETAILED DESCRIPTION OF THE INVENTION

Figure 1:
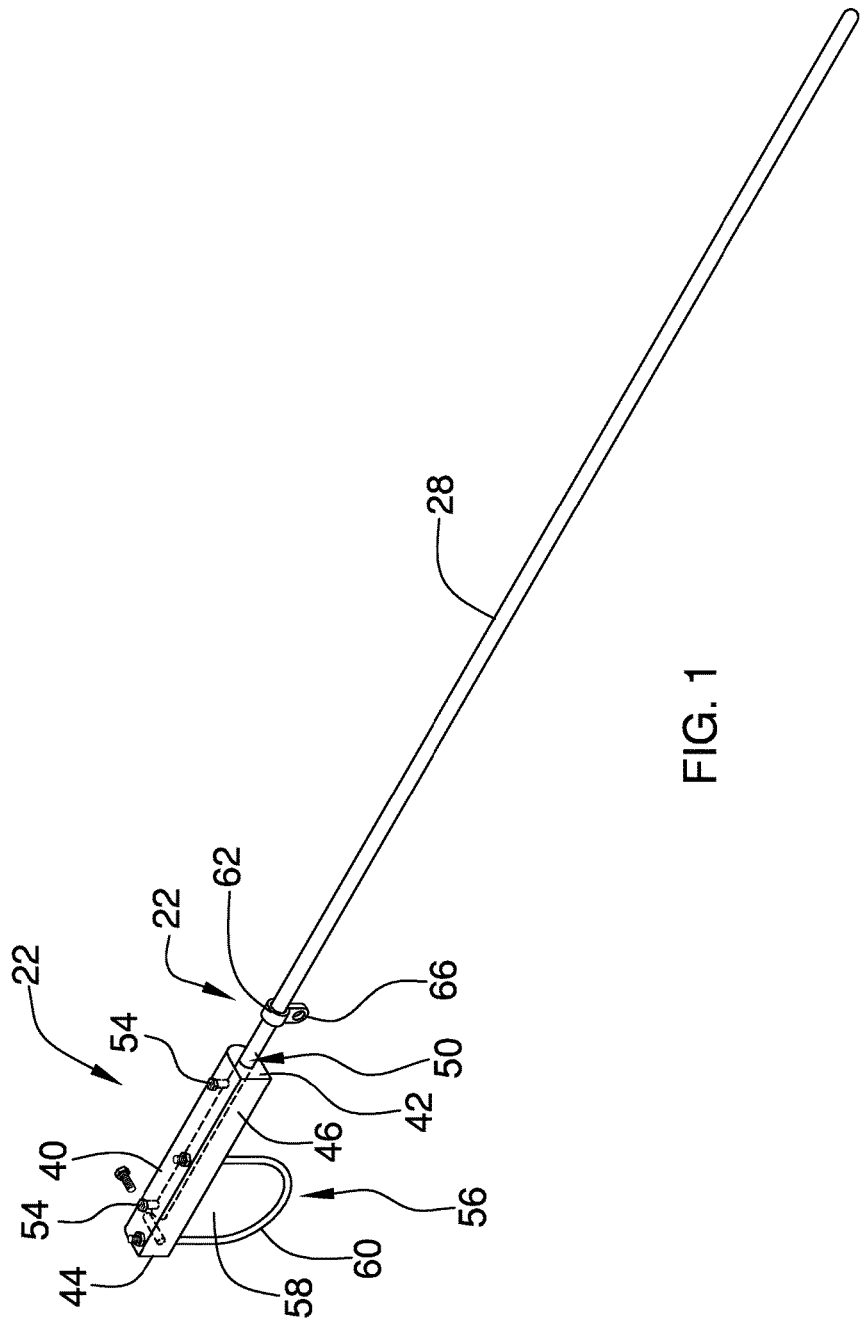
FIG. 1 is a top front side perspective view of a hay rake wheel anti-clogging system according to an embodiment of the disclosure.
Figure 2:
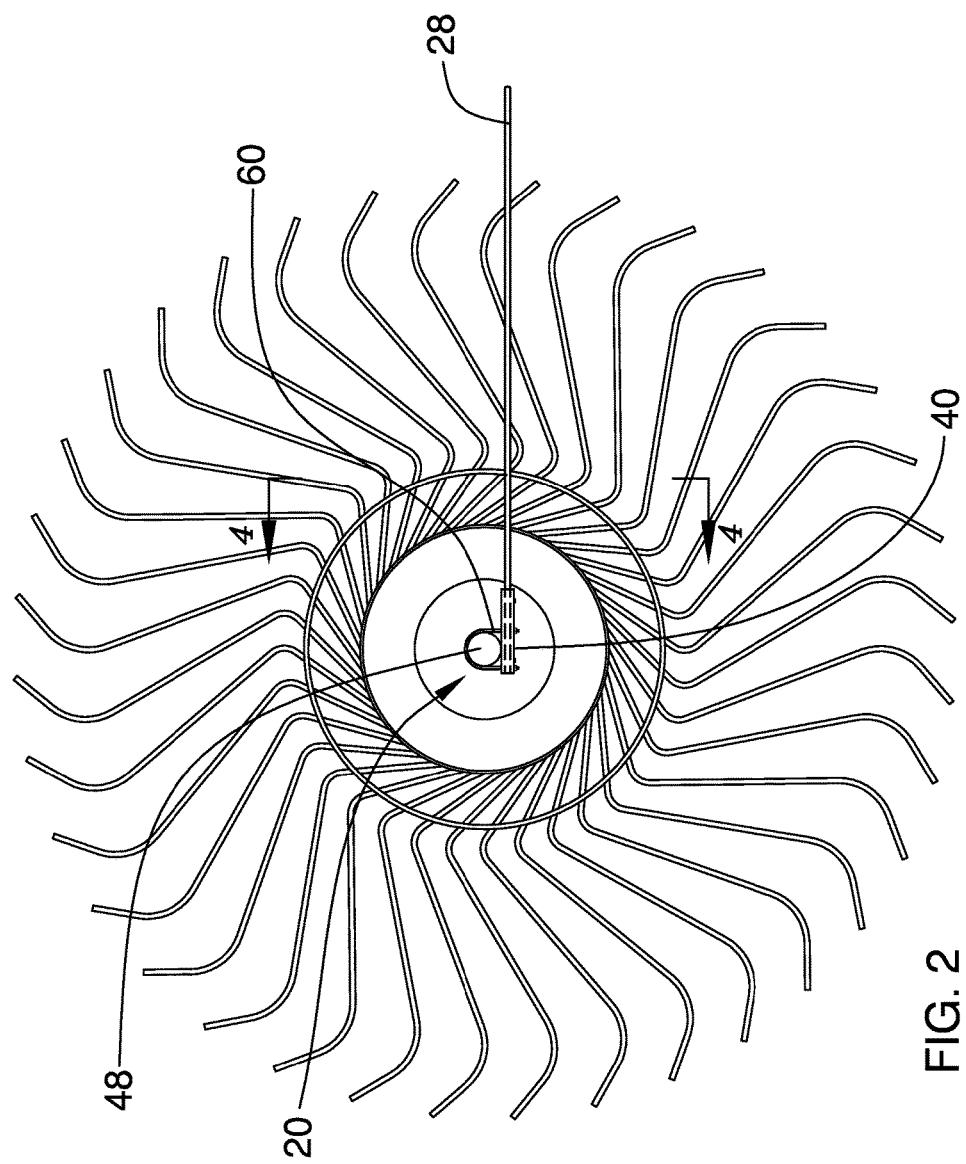
FIG. 2 is a front view of an embodiment of the disclosure.
Figure 5:
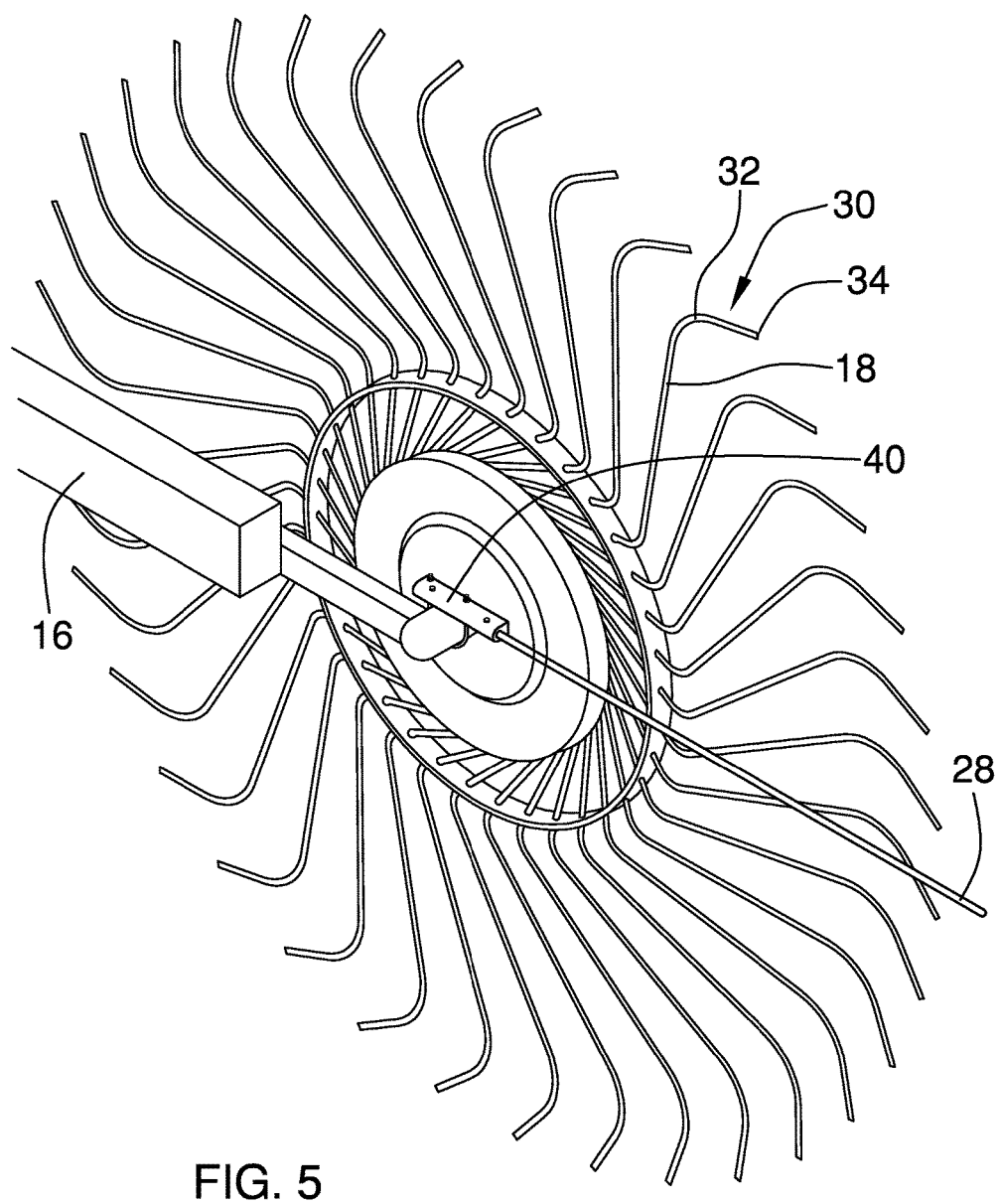
FIG. 5 is a top front side perspective view of an embodiment of the disclosure.
Figure 6:
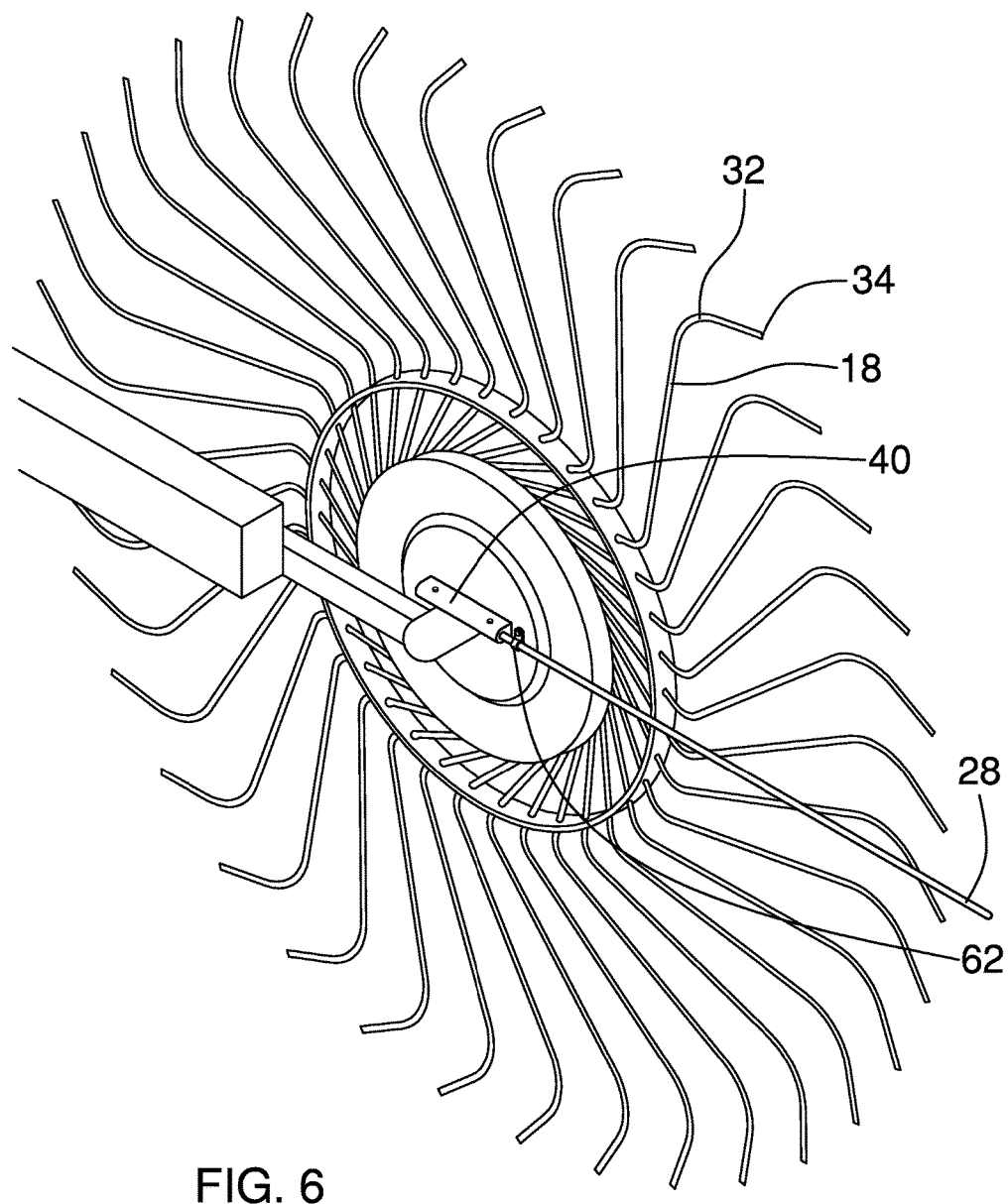
FIG. 6 is a top front side perspective view of an alternative embodiment of the disclosure.
Figure 7:
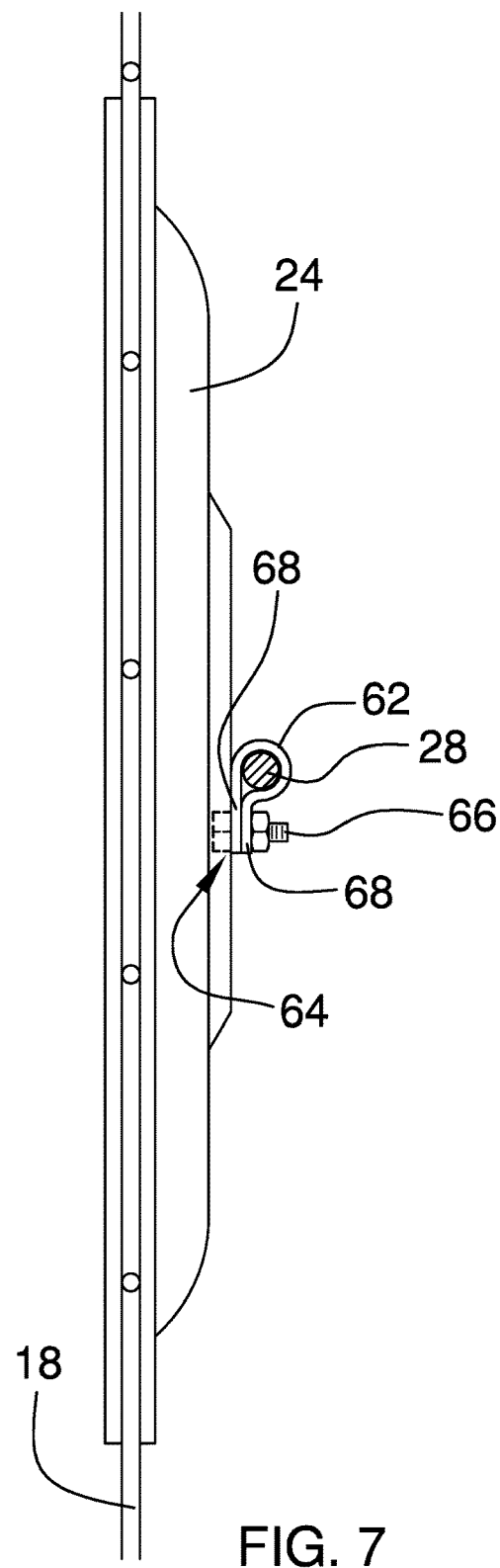
FIG. 7 is a partial cut-away side view of an alternative embodiment of the disclosure.

With reference now to the drawings, and in particular to FIGS. 1 through 7 thereof, a new hay rake wheel device embodying the principles and concepts of an embodiment of the disclosure and generally designated by the reference numeral 10 will be described.

As best illustrated in FIGS. 1 through 7, the hay rake wheel anti-clogging system 10 generally comprises a vehicle 12 of a conventional type such as a tractor used for tending to fields. A hay rake wheel 14 is coupled to the vehicle 12. The hay rake wheel 14 is typically one of a plurality of hay rake wheels coupled to the vehicle 12 by way of a trailer 16 being pulled by the tractor 12. As is conventionally known, a plurality of the hay rake wheels 14 are arranged and pulled by the vehicle 12 such that each hay rake wheel 14 engages a ground surface resulting in rotation of the hay rake wheel 14. The hay rake wheel 14 comprises a plurality of tines 18 extending from a hub 20. The tines 18 are fixed relative to the hub 20 and are thus rotated as the hay rake wheel 14 rotates. The tines 18 are coplanar and have bends such that the tines 18 are configured for raking the ground surface. A mount 22 is coupled to the vehicle 12 by way of being coupled to the trailer 16 proximate to the hay rake wheel 14. In some versions of conventional hay rake wheels 14, a hub guard 24 may be provided. When provided, the hub guard 24 is positioned adjacently to the hub 20 of the hay rake wheel 14. As described in more detail below, the mount 22 may be coupled directly to the hub guard 24. A rod 28 is coupled to and extends from the mount 22. The rod 28 is elongated and is positioned adjacent to the hay rake wheel 14 such that the rod 28 contacts the tines 18 as the tines 18 are urged towards the rod 28 by movement of the vehicle 12 in a manner rotating the hay rake wheel 14. The tines 18 are generally urged to bend back due to contact with the ground surface. The rod 28 is in parallel to the tines 18 when the tines 18 are not being urged out of their resting planar position. The rod 28 is extended away from the hub 20 such that the rod 28 moves across distal end sections 30 of the tines 18 in a direction from a proximal end 32 of the distal section 30 towards a free end 34 of the tine 18 to prevent debris from collecting on the tines 18. The rod 28 may be constructed of fiberglass or the like.

In an embodiment, the mount 22 comprises a housing 40. The housing 40 is elongated having a first end 42 and a second end 44. The housing 40 has a flat face 46 positionable to abut either the hub guard 24 or a disc or other surface extending from an axle housing 48 aligned with the hub 20. A socket 50 extends into the first end 42 of the housing 40. The rod 28 is insertable into the socket 50. A fastener 52 secures the rod 28 in the socket 50. The fastener 52 may be a set screw 54 extendable through the housing 40 and into the socket 50. When no hub guard 24 is present, a coupler 56 may be coupled to the housing 40 forming a loop 58 with the housing 40. The coupler 56 is positionable to extend around the axle housing 48 adjacent to the hay rake wheel 14. Thus, the coupler 56 couples the housing 40 to the axle housing 48. The coupler 56 may be a U-bolt 60 which is parallel to the flat face 46 of the housing 40 when connected.

In an embodiment, the mount 22 comprises a band 62. The band 62 may be incorporated as an alternative to the housing 40 or in combination with the housing 40 when the hub guard 24 is present. The band 62 has a pair of apertures 64 extending therethrough. The band 62 is extended around the rod 28 such that end portions 68 of the band 62 are adjacently positioned with the apertures 64 being aligned. A bolt 66 may be used to secure the band 62 to the hub guard 24 and effectively clamping the band 62 to the rod 28 to secure the rod 28 to the hub guard 24.

In use, the rod 28 is attached to the hay rake wheel 14 in a static position where rotation of the hay rake wheel 14 will bring the tines 18 into contact with the rod 28 as the hay rake wheel 14 is used in a conventional fashion. The rod 28 will move along the respective distal section 30 of each tine 18 to urge material to slide off of the free end 34 of the tine 18 and prevent clogging of the hay rake wheel 14 during use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hay rake wheel anti-clogging system comprising:
a vehicle;
a hay rake wheel coupled to said vehicle, said hay rake wheel comprising a plurality of tines extending from a hub, said tines being rotated wherein said tines are configured for raking;
a mount, said mount being coupled to said vehicle proximate to said hay rake wheel, said mount comprising a housing, said housing having a flat face;
a rod, said rod being coupled to and extending from said mount, said rod being elongated, said rod being positioned adjacent to said hay rake wheel such that said rod contacts said tines as said tines are urged towards said rod by movement of said vehicle in a manner rotating said hay rake wheel; and
a coupler, said coupler being coupled to said housing and forming a loop with said housing wherein said coupler is positionable to extend around an axle housing coupled to said vehicle adjacent to said hay rake wheel whereby said coupler couples said housing to said axle housing, said flat face being positionable to abut a hub guard extending from said axle housing.

2. The system of claim 1, further comprising said rod being constructed of fiberglass.

3. The system of claim 1, further comprising:
said housing being elongated having a first end and a second end; and
a socket extending into said first end of said housing, said rod being insertable into said socket.

4. The system of claim 3, further comprising a fastener, said fastener securing said rod in said socket.

5. The system of claim 4, further comprising said fastener being a set screw extendable through said housing and into said socket.

6. The system of claim 1, further comprising said coupler being a U-bolt.

7. The system of claim 6, further comprising said U-bolt being parallel to a flat face of said housing.

8. The system of claim 1, further comprising a hub guard coupled to said vehicle, said hub guard being positioned adjacently to said hub of said hay rake wheel.

9. The system of claim 8, further comprising said mount being coupled directly to said hub guard.

10. The system of claim 1, further comprising:
said mount comprising a band, said band having a pair of apertures extending therethrough, said band being extended around said rod such that end portions of said band are adjacently positioned with said apertures being aligned.

11. A hay rake wheel anti-clogging system comprising:
a vehicle;
a hay rake wheel coupled to said vehicle, said hay rake wheel comprising a plurality of tines extending from a hub, said tines being rotated wherein said tines are configured for raking;
a hub guard coupled to said vehicle, said hub guard being positioned adjacently to said hub of said hay rake wheel;
a mount, said mount being coupled to said vehicle proximate to said hay rake wheel, said mount being coupled directly to said hub guard;
a rod, said rod being coupled to and extending from said mount, said rod being elongated, said rod being positioned adjacent to said hay rake wheel such that said rod contacts said tines as said tines are urged towards said rod by movement of said vehicle in a manner rotating said hay rake wheel, said rod being constructed of fiberglass;
said mount comprising a housing, said housing being elongated having a first end and a second end, said housing having a flat face, said flat face being positionable to abut a hub guard extending from said axle housing;

a socket extending into said first end of said housing, said rod being insertable into said socket;

a fastener, said fastener securing said rod in said socket, said fastener being a set screw extendable through said housing and into said socket; and a coupler, said coupler being coupled to said housing and forming a loop with said housing wherein said coupler is positionable to extend around an axle housing coupled to said vehicle adjacent to said hay rake wheel whereby said coupler couples said housing to said axle housing, said coupler being a U-bolt, said U-bolt being parallel to said flat face of said housing.

12. A hay rake wheel anti-clogging system comprising:

a vehicle;

a hay rake wheel coupled to said vehicle, said hay rake wheel comprising a plurality of tines extending from a hub, said tines being rotated wherein said tines are configured for raking;

a hub guard coupled to said vehicle, said hub guard being positioned adjacently to said hub of said hay rake wheel;

a mount, said mount being coupled to said vehicle proximate to said hay rake wheel, said mount being coupled directly to said hub guard;

a rod, said rod being coupled to and extending from said mount, said rod being elongated, said rod being positioned adjacent to said hay rake wheel such that said rod contacts said tines as said tines are urged towards said rod by movement of said vehicle in a manner rotating said hay rake wheel, said rod being constructed of fiberglass;

said mount comprising a housing, said housing being elongated having a first end and a second end, said housing having a flat face, said flat face being positionable to abut a hub guard extending from said axle housing, said mount being coupled directly to said hub guard;

a socket extending into said first end of said housing, said rod being insertable into said socket;

a fastener, said fastener securing said rod in said socket, said fastener being a set screw extendable through said housing and into said socket; and said mount comprising a band, said band having a pair of apertures extending therethrough, said band being extended around said rod such that end portions of said band are adjacently positioned with said apertures being aligned, said band being coupled directly to said hub guard.

* * * * *